United States Patent
Ozugur et al.

(10) Patent No.: US 7,043,256 B2
(45) Date of Patent: May 9, 2006

(54) APPARATUS, AND AN ASSOCIATED METHOD, FOR PAGING A MOBILE STATION OPERABLE IN A RADIO COMMUNICATION SYSTEM

(75) Inventors: Timucin Ozugur, Garland, TX (US); Behcet Sarikaya, Plano, TX (US)

(73) Assignee: Alcatel, Paris (FR)

( * ) Notice: Subject to any disclaimer, the term of this patent is extended or adjusted under 35 U.S.C. 154(b) by 275 days.

(21) Appl. No.: 10/639,987

(22) Filed: Aug. 13, 2003

(65) Prior Publication Data

US 2005/0037781 A1 Feb. 17, 2005

(51) Int. Cl.
*H04Q 7/20* (2006.01)

(52) U.S. Cl. .............................. 455/456.1; 455/456.2; 455/456.3; 455/41.2

(58) Field of Classification Search ............. 455/456.1, 455/458; 370/227; 709/227, 229
See application file for complete search history.

(56) References Cited

U.S. PATENT DOCUMENTS 6,446,127 B1 9/2002 Schuster et al.

| | | | |
|---|---|---|---|
| 2003/0145092 A1* | 7/2003 | Funato et al. | 709/229 |
| 2003/0225887 A1* | 12/2003 | Purnadi et al. | 709/227 |
| 2004/0002343 A1* | 1/2004 | Brauel et al. | 455/456.1 |
| 2004/0013128 A1* | 1/2004 | Moreton et al. | 370/447 |
| 2004/0203894 A1* | 10/2004 | Watanabe et al. | 455/456.1 |

OTHER PUBLICATIONS

IEEE Standards; 802.11F; IEEE Trial-Use Recommended Practice for Multi-Vendor Access Point Interoperability via an Inter-Access Point Protocol Across Distribution Systems Supporting IEEE 802.11 Operation; 2003; pp. i-67.

* cited by examiner

*Primary Examiner*—Sonny Trinh
*Assistant Examiner*—Phuoc Doan
(74) *Attorney, Agent, or Firm*—Scheef & Stone, LLP; Bobby D. Slaton; Jessica W. Smith

(57) ABSTRACT

Apparatus, and an associated method, by which to page a mobile station to alert the mobile station of a call placed thereto. A location server is provided at which a location index is created and maintained, identifying the location at which the mobile station to which the call is to be terminated is positioned. Page messages are broadcast throughout an area in which the mobile station is indicated to be positioned. The page messages are broadcast in manners that permit the mobile station to detect their transmission even when the mobile station is in a dormant, or other nonactive, state.

17 Claims, 3 Drawing Sheets

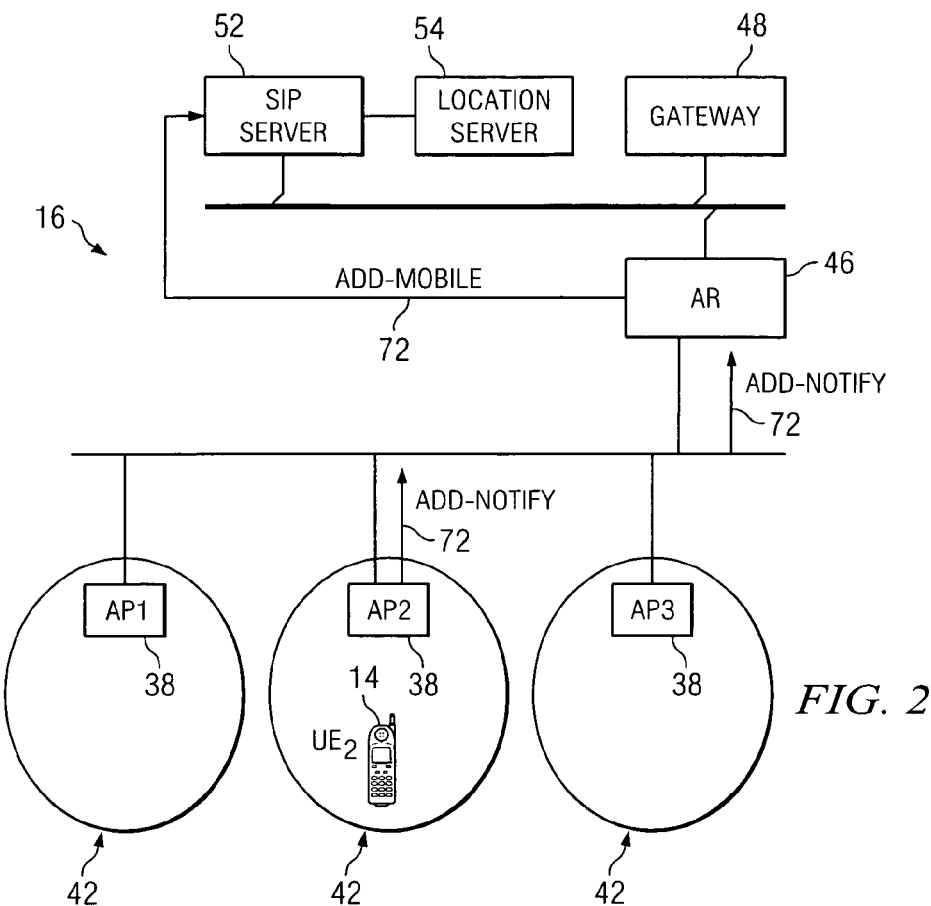

| PREFIX | IP @ |
|---|---|
|  |  |
|  |  |

APPARATUS, AND AN ASSOCIATED METHOD, FOR PAGING A MOBILE STATION OPERABLE IN A RADIO COMMUNICATION SYSTEM

The present invention relates generally to a manner by which to page a mobile station to alert the mobile station of a SIP (Session Initiation Protocol), or other, call placed thereto. More particularly, the present invention relates to an apparatus, and an associated method, by which to identify an area within which to paged the mobile station and to page the mobile station in a manner to alert the mobile station of the call. A location index is created and maintained, identifying the location at which the mobile station is positioned. When the mobile station is page, the mobile station is able to detect the page when the mobile station is in a dormant, as well as active, mode.

Because the location at which the mobile station is identified, the page is broadcast first only in an area in which the mobile station is identified to be positioned. And, missed pages are less likely to occur as the mobile station need not be in an active mode to detect the page. Pages therefore are less likely to be repeated, thereby more efficiently utilizing system resources. When implemented in a WLAN (Wireless Local Area Network) operable pursuant to an IEEE 802.11 scheme, a TIM (Traffic Information Map) message, detectable by a dormant mobile station, is first sent to page the mobile station at TIM intervals.

BACKGROUND OF THE INVENTION

The need to communicate data is an endemic need of modern society. Data is communicated by way of a communication system. And, a communication system includes, at least a set of communication stations and a communication channel that interconnects the communication stations. Data is originated at, or otherwise sourced, at a first of the communication stations, and the data is caused to be communicated upon the communication channel to another communication station of the set of communication stations. The communication station from which the data is sent is referred to as a sending station, and the communication station to which the data is communicated is referred to as a receiving station. Data is communicated to effectuate many varied types of communication services. And, different types of communication systems have been developed by which to provide for the effectuation of the different types of communication services. As advancements in communication technologies permit, communication systems are developed and implemented that permit effectuation of new types of data services or data services of improved capabilities and qualities. Advancements in communication technologies, for instance, have permitted the introduction of new types of radio communication systems as well as improvements to the capabilities and performance of existing communication systems.

In a radio communication system, the communication channels upon which data is communicated between sending and receiving stations are defined upon a radio air interface extending therebetween. Wire line connections, conventionally required in a conventional wire line communication system to interconnect the sending and receiving stations is not required. Installation and use of a radio communication system provides various advantages over a wire line counterpart. Costs associated with the initial installation and deployment of a radio communication system are generally less than the corresponding costs required to install and deploy a wire line counterpart. Additionally, a radio communication system is amenable for implementation as a mobile communication system in which communication mobility is provided.

A type of radio communication system that is widely deployed and popularly utilized is a cellular communication system. Network infrastructures of cellular communication systems have been installed to encompass many of the populated areas of the world. Usage of cellular communication systems to communicate therethrough is increasing, both in terms of increased numbers of users and increased amounts of usage.

Initial deployments of cellular communication systems made use of analog communication techniques, utilizing circuit switched connections. Circuit switched voice communications as well as low bandwidth data communication services are effectuable in such first deployed cellular communication systems.

Successive generations of cellular communication systems have been developed, installed, and deployed. Successor generation systems generally utilize digital communication techniques and provide for packet switched communications in which packet formatted data is communicated pursuant to effectuation of communication services.

Ongoing standardization procedures related to an operating specification of a universal mobile telephone service/general packet radio service (UMTS/GPRS) also pertain to a radio communication system that provides for packet switched communication services.

Other radio communication systems provide communication services analogous to those provided by cellular communication systems. And, corresponding advancements in communication technologies have been implemented in such systems, or have made such systems possible. For instance, WLANs (Wireless Local Area Networks) provide for radio communications with users of mobile stations. WLANs have been implemented both as private network systems and public network systems. WLANs generally provide for the effectuation of high data rate communication services, sometimes at costs substantially lower than the effectuation of corresponding communication services in a public access cellular communication system.

WLANs are sometimes implemented to be operable in compliance with the operating protocol set forth in an IEEE 802.11, or variant, operating specification. WLANs of this type of implementation provides for high bandwidth communication services, e.g., between 11 and 54 Mbps within relatively small coverage areas.

WLANs provide complementary communication services to those provided by wide area cellular communication systems. Communication sessions are formable between a mobile station operable in a WLAN and a communication station operable in an external network when the external network and the WLAN are appropriately connected theretogether. The external network forms, for instance, a UMTS/GPRS system. A mobile station operable in the UMTS/GPRS operates, for instance, to initiate to a mobile station operable in the WLAN. The call forms, for instance, an IMS call. Pursuant to call initiation, the UMTS/GPRS mobile station sends an SIP (Session Initiation Protocol) INVITE to a SIP server of the UMTS network. The radio portion of the UMTS network is sometimes referred to as an UTRAN (UMTS Terrestrial Radio Access Network). A call session control function (CSCF) is embodied at the server. The CSCF determines that the terminating station is beyond the domain of the UMTS and forwards the INVITE message to a SIP server in the WLAN. And, the SIP server of the WLAN forwards the message to the terminating mobile station. A problem occurs in the event that the terminating mobile station is not in an active mode when the INVITE message is broadcast thereto. Namely, if the mobile station is in a dormant mode when the message is broadcast, the mobile station does not detect the message, and a negative reply is returned to the UMTS.

While proposals have been set by which to multicast the INVITE message over a wide area, such as multicasting the message within a sub network and hierarchically through an entire domain, the problems associated with non detection of the message at a dormant mobile station are not adequately solved.

If a manner could be provided by which better to alert a dormant mobile station of the call initiation, improved communication operations would be possible.

It is in light of this background information related to initiation of a communication session in a radio communication system that the significant improvements of the present invention have evolved.

SUMMARY OF THE INVENTION

The present invention, accordingly, advantageously provides an apparatus, and an associated method, by which to page a mobile station to alert the mobile station of a call placed thereto.

Through operation of an embodiment of the present invention, a location index is created and maintained. The location index identifies the location at where the mobile station is positioned. The location index is accessed prior to paging of the mobile station and used to select to where the page is broadcast. The location index mentioned here is not populated directly from the SIP location server. The SIP location server caches the SIP URIs, which are mapped to IP addresses, but the location server cache mentioned here keeps the paging related addresses, such as addresses of the Access Points (APs).

Also, through operation of an embodiment of the present invention, a manner is provided by which to page the mobile station in a manner to alert the mobile station of the call. The mobile station is alerted of the call placed thereto even when the mobile station is in a dormant, as well as an active, state.

Because the location at which the mobile station is identified, the page is broadcast first only in an area in which the mobile station is identified to be positioned.

And, because the mobile station need not be in an active state to detect the page, broadcast at TIM intervals, missed pages are less likely to occur. And, because of the increased likelihood that a page shall be detected, repeated page attempts are not required, and communication resources available in the communication system are permitted to be utilized more efficiently. During operation of an exemplary implementation of an embodiment of the present invention, a mobile station operable in the WLAN is tracked to obtain, and to maintain, positional indicia indicating the position of the mobile station. When a call is initiated for termination at the mobile station forming a terminating node, the mobile station is paged in an area in which the mobile station is indicated by the positional indicia associated therewith, to be located.

A location server is embodied at the WLAN. A location index is created and maintained at the location server. The location server (different than SIP location server) is embodied, for instance, at a platform common to a SIP (Session Initiation Protocol) server (or to a SIP location server, which keeps the SIP addresses of the user agents) to which a call initiation request is routed when delivered from an external network. The position at which the mobile station to which the call is placed is ascertained at the location index. And, a page is broadcast throughout the area at which the mobile station is indicated to be located. Rebroadcast of the page is also selectably performed in the event that the page does not appear to have been successfully delivered.

In an implementation in which the WLAN is operable pursuant to the IEEE 802.11 operating specification, the location index is created by a tracking procedure. In the tracking procedure, mobile stations operable in the WLAN transmit ADD-notify packets. An access point to which the ADD-notify packet is delivered, forwards on the message contents, together with an indication of the access point, and such information forms index entries at the location index. The entries of the location index are updated, as needed.

When a call request is generated, a SIP INVITE is delivered to the WLAN and routed to the SIP server and location server embodied together therewith. The location index is accessed to determine the positioning of the mobile station to which the call is placed. And, a paging request is forwarded to the access point, or access points, associated with the location at which the mobile station is indicated to be positioned. The page request is broadcast by the access point throughout the area encompassed by the access point. When the mobile station detects the paging request, the mobile station replies with a paging reply that is routed back to the SIP server. Formation of a call connection thereafter commences.

The paging request first sent to the mobile station forms a layer 2 (L2) message, detectable by the mobile station, even when in the dormant state. As the mobile station need not be in the active mode to detect the paging request, problems associated with failed detection of a paging request broadcast to the mobile station are less likely to occur.

In these and other aspects, therefore, apparatus, and an associated method, is provided for a radio communication system. The radio communication system has a network part and a mobile station selectably operable to communicate with the network part by way of a radio air interface. The mobile station is operable in an active state and at least a dormant. Initiation of a communication session with the mobile station in which the mobile station forms a terminating node is facilitated. A page message generator is embodied at the network part. The page message generator generates a page message for broadcast upon the radio air interface to alert the mobile station of an invitation to initiate the communication session with the mobile station. The page message forms a wake-up indicator. The wake-up indicator is detectable by the mobile station when in the dormant state.

A more complete appreciation of the present invention and the scope thereof can be obtained from the accompanying drawings that are briefly summarized below, the following detailed description of the presently preferred embodiments of the invention, and the appended claims.

BRIEF DESCRIPTION OF THE DRAWINGS

FIG. 2 illustrates a functional block diagram of a portion of the communication system shown in FIG. 1, here illustrating signals generated during operation of the communication system by which to create a location index that identifies the locations at which mobile stations operable therein are positioned.

FIG. 3 illustrates a representative of an exemplary database formed pursuant to operation of an embodiment of the present invention.

DETAILED DESCRIPTION

Figure 1:
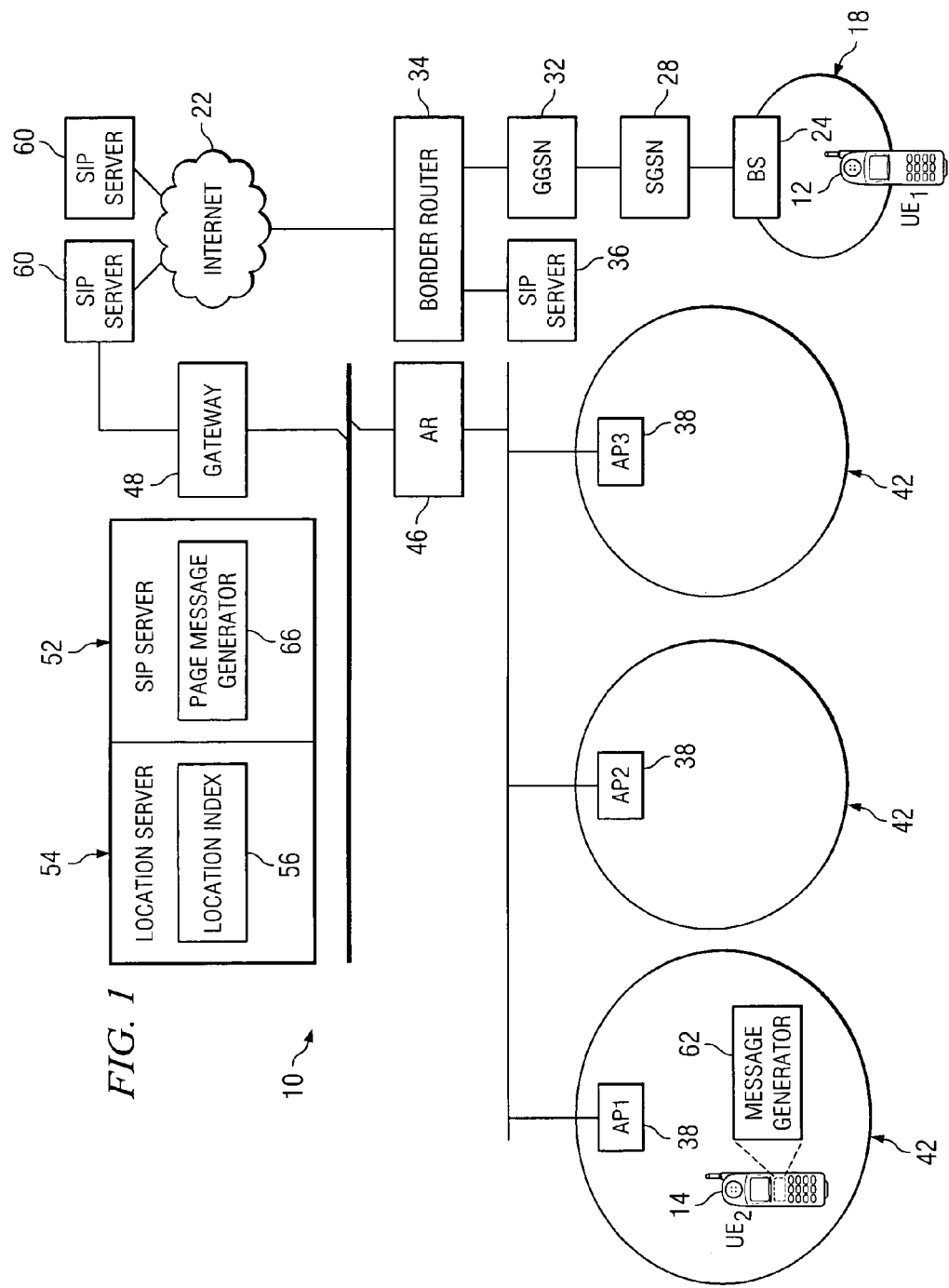
FIG. 1 illustrates a functional block diagram of a radio communication system in which an embodiment of the present invention is operable.

Referring first to FIG. 1, a radio communication system, shown generally at 10, provides for radio communications with mobile stations of which mobile stations 12 and 14 are representative. The mobile stations are alternately referred to as mobile nodes and user equipment, and such terminology shall be used interchangeably herein.

The mobile station 12 is here representative of a mobile station operable in a UMTS/GPRS (Universal Mobile Telephone Service/General Packet Radio Service) system, or a variant thereof. And, the mobile station 12 is representative of a mobile station operable pursuant to an IEEE 802.11 operating specification or variant thereof.

The communication system includes a network infrastructure capable of communicating with the mobile stations 12 and 14. The network infrastructure is formed of a first portion 16 forming the network infrastructure of a WLAN (Wireless Local Area Network) that operates pursuant to the IEEE 802.11 operating specification. And, the network infrastructure also includes a portion 18 operable pursuant to the operating specification of a UMTS/GPRS system. The separate network portions are connected to a packet data backbone, here the Internet 22. Packet switched communication connections are provided between the network portions 16 and 18 by way of the packet data network 22.

The network portion 18 forms a radio access network (RAN). The radio access network includes a base station 24 that defines a coverage area forming a cell 26. The mobile station 12 is here shown to be positioned within the cell defined by the base station 24. The base station is coupled to a SGSN (Serving GPRS Service Node) 28 by way of, e.g., a radio network controller (not shown). The SGSN, in turn, is coupled to a GGSN (Gateway GPRS Service Node) 32 that is coupled to a router, a border router 34, associated with the radio access network. The border router is coupled to the Internet 22. And, the border router is coupled to a SIP (Session Initiation Protocol) server 36 that operates, amongst other things, pursuant to call set up and routing of a SIP session initiated by a communication station operable to communicate by way of the network portion 18.

The network portion 16 forms the network of a WLAN. The WLAN includes access points (APs) 38. Each of the access points defines a coverage area forming a cell, or paging area, 42. The mobile station 14 is here represented, initially, to be positioned within the cell defined by the first access point AP1. The access points are coupled to an access router 46 that operates in conventional manner to perform routing functions. The access router is connected to the internet by way of a gateway 48. And, the WLAN also includes a server 52. The server 52 forms a SIP server 52, and, in the exemplary implementation, embodied at the same platform, a location server 54 of an embodiment of the present invention.

During operation of an embodiment of the present invention, a location index, shown at 56, is created and maintained at the location server. The location index is formed of entries that identify the mobile station and its location in terms of the access with which it communicates.

The information that is obtained by the location server and that forms the entries of the location index thereof, is generated by a message generated by a message generator 62 embodied at the mobile stations, such as the mobile stations 14 that communicate with the WLAN. The signals are communicated over the radio air interface to the WLAN and routed through the WLAN to the location server 54.

The communication system also includes other SIP servers, such as the SIP server 60 that forms an intermediary node, as shall be described below, during signaling operations.

And, the WLAN includes a page message generator 66 embodied at the SIP server or distributed at the access points 38. The page message generator 66 operates pursuant to an embodiment of the present invention by which to page a mobile station during a call session initiation procedure.

In its various aspects, therefore, operation of an embodiment of the present invention provides a manner by which to page a mobile station to alert the mobile station of a SIP call placed thereto. Layer 2 mobility of the mobile station 14 is tracked, and the tracked information is utilized during paging operations by which to page the mobile station. Paging is performed in a manner such that a mobile station in a power save, or other dormant, mode is capable of detecting the page.

FIG. 2 illustrates the portion 16 of the communication system 10 (shown in FIG. 1). Elements previously shown and described are commonly referenced. Here, signaling by which to create the entries of the location index 56 is represented.

The message generator of the mobile station 14 generates ADD-Notify or ADD-Modify messages that are sent over the radio air interface to an appropriate access point 38. In FIG. 2, the ADD-Notify message is represented at 72, and is routed through the WLAN to the SIP server and the location server embodied theretogether. When delivered to the location server, the positional indicia associated with the mobile station, here the identity of the access point that first receives the ADD-Notify or ADD-modify message, by the IP address of the associated access point, together with the IP address of the mobile station.

The location index at the location server keeps track of which AP coverage area at which the mobile station has recently been positioned. FIG. 3 illustrates the database 56 formed of the location index created and maintained at the location server. The location index is formed of rows 76 associated with individual ones of the mobile stations 14. Each mobile station includes a MAC (Medium Access Control) address indicated in the column 78 and an IP address, indicated in the column 82. And, a base station system IP address associated with the access point 38 through which the mobile station communicates is indicated in the column 84. The MAC address of the mobile station is contained in a data field of the ADD-notify packet message. The BSS IP is the source IP address in the ADD-Notify message. The IP address of the mobile station is initially empty as a (re) association request is a layer 2 message. When the mobile station is assigned with an IP address, the access router 46 of the WLAN sends an ADD-mobile packet to the SIP server 52. The message is a UDP packet and the data field thereof has a 64 bit MAC address, 128 bit IP address of the mobile station, a 128 bit prefix, an 8 bit prefix size in bits (maximum 128), and a 128 bit IP address of the access point (BSS-IP).

Figures 4, 5:
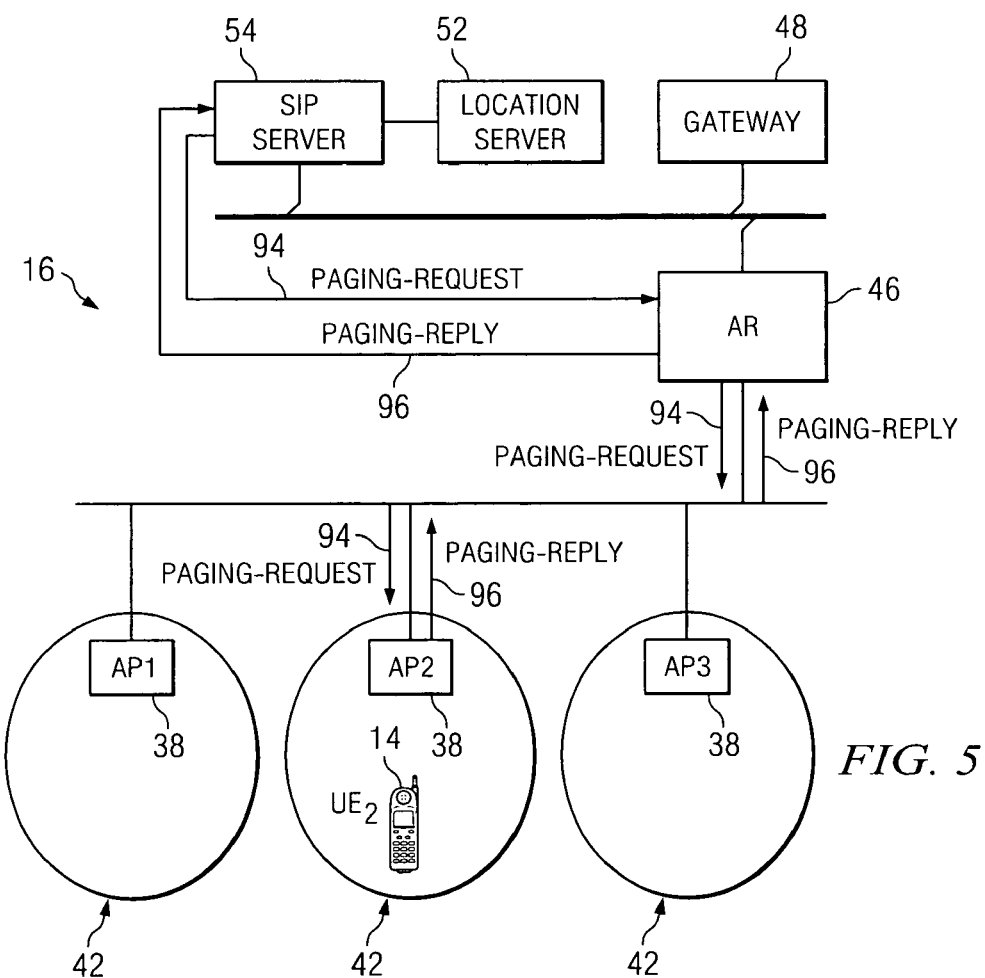
FIG. 4 illustrates a representation of another exemplary database formed pursuant to operation of an embodiment of the present invention.
FIG. 5 illustrates a functional block diagram of a portion of the communication system shown in FIG. 1, here representative of signaling generated during operation of an embodiment of the present invention.

FIG. 4 illustrates a paging database 88. The paging database is relatively static, i.e., hard state. The paging database maintains the identities of access points and their IP addresses until a subsequent ADD-Notify, or ADD-Modify, message provides a new access point or the SIP server 52 realizes a new access point to be associated with the mobile station during its paging procedure. Subsequent to reception at the location server of each ADD-Mobile message routed to the location server by way of the access router, the SIP server maintains a list of all unique access points in the database 88. The list is organized, as illustrated in the Figure, such that the access points in a common sub network, such as the three access points shown in FIGS. 1 and 2 with the same prefix, and all of the distinct sub networks in the domain are thereby easily identifiable. The list 88 is used pursuant to paging operations. Because the entries on the list are generally not likely to change, the list 88 is static.

FIG. 5 illustrates again the WLAN 16. Here, signaling generated during paging procedures is illustrated.

Paging procedures at the WLAN commence when a SIP invite message is delivered, e.g., from the SIP server of the radio access network 18 (shown in FIG. 1). A least recently used AP algorithm, or other appropriate algorithm, is utilized. The INVITE message is delivered to the SIP server 52. And, responsive thereto, the location server searches the location index to obtain a corresponding entry in the paging database formed thereof for the location of the mobile station that forms the terminating node. Once the location is determined, a paging request is generated and routed to the identified access point. The routing of the paging request message is indicated by the arrows 94. In the exemplary implementation, the paging request message forms a UDP (User Datagram Protocol) message that contains MAC and IP addresses of the mobile station in the data field of the UDP message.

When delivered to the appropriate access point, layer 2 paging commences. The access point receives the layer 2 page request. And, the page message generator 66 operates to set a corresponding bit in the TIM (Transfer Information Management) packet to the association ID (AID) of the mobile station. And, the TIM is broadcast at TIM intervals.

The paged mobile station responds to the paging request by a PS-poll control frame. Upon detection of the PS-poll control frame, the access point sends a paging request data frame to the mobile station. The mobile station checks to see whether the address associated with the mobile station is contained in the field of the transmitted frame. If the address is detected to be therein, the mobile station enters into the active mode in logical layer 3, e.g., and the mobile station performs an MIP registration.

The access point then sends a paging reply message back to the SIP server 52. If the reply is positive, the SIP server delivers the SIP invite message to the mobile station. Routing of the paging reply is indicated in the Figure by the arrows 96.

If, conversely, the paging reply is negative, the SIP server forwards on the paging request message to other access points 38 in the same sub network and, thereafter, to access points in other sub networks of the WLAN. If no positive reply is returned, the SIP server sends a "404 Not Found" response to the originating CSCF of the radio access network.

In operation of a further embodiment of the present invention, the page is subsequently broadcast in additional domains in the event that the page is unsuccessfully delivered in the WLAN. When the source SIP server 36 (shown in FIG. 1) forms the INVITE message, a record route header is included in the message. And, subsequent SIP servers, such as the SIP server 60 (also shown in FIG. 1) also have their respective addresses inserted into the INVITE message. When the INVITE message is delivered to the SIP server 52 of the WLAN, the identities of all SIP servers in the path between the initiating SIP server and the destination SIP server are known. The record route header contained in the INVITE message thereby enables the destination SIP server 52 to trigger other proxy servers to page the mobile station in the event that the page in the WLAN is unsuccessful. In this manner, the mobile station is paged in more than one domain, and a final "404 Not Found" response is returned only upon failure successfully to page the mobile station in all of the intermediary domains.

Any intermediate proxy SIP server initiates paging as that just described with respect to paging in the WLAN 16. If a paging reply is returned, the INVITE message is delivered to the mobile station and the reply of the mobile station is relayed back to the source SIP server. If the reply is negative, then the associated SIP server sends a "404 Not Found" response to the previous proxy SIP server that itself starts its paging in the domain. The procedures continue until a response reaches the source SIP server or until the INVITE message is successfully delivered.

Paging in other domains allows paging of the mobile stations that roam through heterogeneous networks, such as WLANS and a UMTS. If the mobile station is known initially to be in the WLAN, paging is first performed there. However, if the mobile station moves to another network, such as the UMTS, a proxy SIP server shall be in the domain of the UMTS, and, pursuant to operation of an embodiment of the present invention, the SIP server in the UMTS domain shall initiate a paging using UMTS paging protocols.

The ADD-Mobile and ADD-Notify messages that include the IP addresses of the respective mobile stations are formable using IPv4 as well as Ipv6 identifiers. When Ipv4 is used, a sub net mask length is used. And, when such identifiers are used, the identifiers contained in the database 88 (shown in FIG. 4) are appropriately, correspondingly identified.

Thereby, a manner is provided by which to page a mobile station to receive an SIP call. The page is broadcast to an area in which the mobile station is most likely to be located, and the page is broadcast in a manner that permits the mobile station to detect the page, whether in an active state or in a dormant state. Improved communications are thereby possible as the likelihood of successful delivery of the page is increased.

The previous descriptions are of preferred examples for implementing the invention, and the scope of the invention should not necessarily be limited by this description. The scope of the present invention is defined by the following claims:

We claim:

1. In a communication system having a network part and a mobile station selectably operable to communicate with the network part by way of a radio air interface, wherein the network part comprises a first access point defining a first coverage area and at least a second access point defining at least a second coverage area, the mobile station operable in an active state and at least a dormant state, an improvement of apparatus for facilitating initiation of a communication session with the mobile station, the mobile station forming a terminating node, said apparatus comprising:

a location index for indexing together positional indicia associated with the mobile station forming the terminating node, wherein the positional indicia indexed at said location index identifies in which of the first and at least second coverage areas, respectively, that the mobile station forming the terminating node is positioned; and a page message generator embodied at the network part, said page message generator for generating a page message for broadcast upon the radio air interface throughout an area responsive to the positional indicia indexed at said location index to alert the mobile station of an invitation to initiate the communication session with the mobile station, the page message forming a wake-up indicator, the wake-up indicator detectable by the mobile station when in the dormant state; and wherein the communication system comprises a WLAN (Wireless Local Area Network) operable pursuant to operating parameters of an IEEE 802.11 operating specification that defines ADD-modify messages, and wherein the information provided to said location index is contained in an ADD-modify messase communicated by the mobile station.

2. The apparatus of claim 1 wherein said page message generator is adapted to receive indications of a request to initiate the communication session, and wherein said page message generator generates the page message responsive to reception of the indications of the request to initiate the communications.

3. The apparatus of claim 2 wherein the communication system further comprises an initiating node that generates the request to initiate the communication session, the request to initiate the communication session identifying the mobile station forming the terminating node with a terminating node identity, and wherein the page message forming the wake-up indicator further comprises values of the terminating node identity.

4. The apparatus of claim 1 wherein the communication system defines Traffic Information Map (TIM) intervals and wherein the page message generated by said page message generator is generated during a selected number of TIM intervals.

5. The apparatus of claim 1 wherein the communication system comprises a WLAN (Wireless Local Area Network) having a location server as a portion thereof, and wherein said location index is embodied at the location server.

6. The apparatus of claim 5 wherein the communication system further comprises an initiating node that generates a request to initiate the communication session, wherein the request to initiate the communication session is routed to the location server, and wherein the page message generated by said page message generator is broadcast throughout an area indicated by said location server at which the terminating node is indicated to be positioned.

7. The apparatus of claim 1 wherein the communication system is defined in terms of logical layers including a physical layer and a second logical layer formed thereabove and wherein the page message formed by said page message generator is formed at the second logical layer, thereby to form a layer 2 (L2) message.

8. The apparatus of claim 7 wherein the communication system comprises a WLAN (Wireless Local Area Network) operable pursuant to an IEEE 802.11 operating specification that defines a Traffic Information Map (TIM) packet, and wherein the wake-up indicator formed of the page message comprises a TIM packet.

9. The apparatus of claim 8 wherein the terminating node formed of the mobile station acknowledges receipt of the TIM packet, and wherein said page message generator further generates a paging request data frame to the terminating node responsive to acknowledgment of the receipt of the TIM packet.

10. The apparatus of claim 9 wherein the mobile station forming the terminating node is identified by a mobile station identifier and wherein the paging request data frame comprises the mobile station identifier as a portion thereof.

11. The apparatus of claim 9 wherein the IEEE 802.11 operating specification further defines a PS-poll control frame and wherein the receipt acknowledged by the mobile station comprises a PS-poll control frame.

12. In a method of communicating in a communication system having a network part and a mobile station selectably operable to communicate with the network part by way of a radio air interface, the communication system comprises a WLAN (Wireless Local Area Network) operable pursuant to operating parameters of an IEEE 802.11 operating specification that defines ADD-modify messages, the mobile station operable in an active state and at least a dormant state, an improvement of a method for facilitating initiation of a communication session with the mobile station, the mobile station forming a terminating node, said method comprising:

indexing together positional indicia associated with the mobile station forming the terminating node, wherein the information provided to said location index is contained in an ADD-modify message communicated by the mobile station; and detecting a request for initiation of the communication session; and responsive thereto generating a page message for broadcast in an area associated with the positional indicia indexed upon the radio air interface to alert the mobile station of an invitation to initiate the communication session with the mobile station, the page message forming a wake-up indicator, the wake-up indicator detectable by the mobile station when in any of the active state and the at least the dormant state.

13. The method of claim 12 wherein the communication system is defined in terms of logical layers including a physical layer and a second logical layer formed thereabove, and wherein the page message generated during said operation of generating is formed at the second logical layer, thereby to form a Layer 2 (L2) message.

14. The method of claim 13 wherein the communication system operates pursuant to an IEEE 802.11 operating specification that defines a Traffic Information Map (TIM) packet and wherein the wake-up indicator formed of the page message generated during said operation of generating comprises a TIM packet.

15. The method of claim 14 further comprising the operation of broadcasting the TIM packet to the mobile station.

16. The method of claim 15 further comprising the operation, by the mobile station Conning the terminating node, of acknowledging reception of the TIM packet.

17. A system for facilitating initiation of a communication session with a mobile station associated with a WLAN (Wireless Local Area Network) which is operable pursuant to operating parameters of an IEEE 802.11 operating specification that defines ADD-modify messages, the mobile station operable in an active state and at least a dormant state, said system:
   a location index for indexing together positional indicia associated with the mobile station, wherein information provided to said location index is contained in an ADD-modify message communicated by the mobile station; and
   a page message generator generating a page message for broadcast upon a radio air interface throughout an area responsive to the positional indicia indexed at said location index to alert the mobile station of an invitation to initiate a communication session with the mobile station, the page message forming a wake-up indicator, the wake-up indicator detectable by the mobile station when in the dormant state.

* * * * *